United States Patent [19]

Marquinez

[11] 3,990,377
[45] Nov. 9, 1976

[54] SELF-PROPELLED MACHINE FOR SEA-BED WORK

[75] Inventor: Jean-Pierre G. Marquinez, Marseille, France

[73] Assignee: SA Compagnie Maritime d'Expertises Comex, Marseilles, France

[22] Filed: July 7, 1975

[21] Appl. No.: 593,471

[30] Foreign Application Priority Data

July 19, 1974 France .............................. 74.25602

[52] U.S. Cl. ............................... 114/16 R; 61/72.4
[51] Int. Cl.² .......................................... B63G 8/00
[58] Field of Search ............... 114/16 R; 61/67, 72.3, 61/72.4; 37/56

[56] References Cited
UNITED STATES PATENTS

| | | | |
|---|---|---|---|
| 3,568,454 | 3/1971 | Itami | 61/69 R |
| 3,683,521 | 8/1972 | Sloan | 61/69 R |
| 3,897,743 | 8/1975 | Schoonman | 114/16 R |
| 3,898,852 | 8/1975 | Ezoe et al. | 61/72.4 |

*Primary Examiner*—Trygve M. Blix
*Assistant Examiner*—Sherman D. Basinger
*Attorney, Agent, or Firm*—Brooks, Haidt, Haffner & Delahunty

[57] ABSTRACT

This invention relates to a self-propelled machine piloted by operators and working on the sea-bed, such machine comprising on the one hand a self-propelled chassis, comprising an electrically powered hydraulic pumping system driven by a submersible motor fed through a cable connecting the chassis to the surface and, on the other hand, a submarine which fixes itself on a platform connected to the self-propelled chassis, and in which submarine the operators are installed. The platform comprises ramps for precentering and centering the submarine. The submarine is fixed temporarily on the platform by electromagnets, and induction coils enable orders to be transmitted between the submarine and the self-propelled chassis.

16 Claims, 5 Drawing Figures

SELF-PROPELLED MACHINE FOR SEA-BED WORK

The present invention relates to a self-propelled machine moving on the sea-bed to carry out mechanical digging or handling operations.

The technical sector of the invention is that of the construction of self-propelled mechanical machines intended for underwater working, particularly machines for burying underwater cables.

Underwater digging machines are already known, particularly for burying cables, which are constituted by plows drawn from the surface by a cable.

The drawback of these machines is that they cannot follow a pre-established path on the sea-bed. It is therefore not possible to unwind the cable on the sea-bed and then to bury it in a trench. The cable must therefore be unwound and buried at the same time, this leading to complex machines.

Bulldozers are also known which move on the sea-bed, being supplied and remotely controlled from the surface.

Like the preceding ones, the remote-controlled machines cannot follow a pre-established path with sufficient accuracy and do not enable one to bury a cable which has already been unwound on the sea-bed.

It is one object to the invention to provide self-propelled mechanical machines which can travel on the sea-bed and which may be accurately guided by an operator, so that the operator may carry out all digging and handling work.

Another object of the present invention is to produce a specific machine for mechanically burying an underwater cable, already unwound on the sea-bed, in a trench. In fact, by dissociating the unwinding and burying operations of the cable, there is a saving of time and equipment of simpler design is obtained.

These objectives could theoretically be achieved by self-propelled machines which would be piloted by a scuba diver at the controls of said machine.

This solution would however present several disadvantages. Firstly, the scuba operator would have to be replaced frequently due to the limited lengths of time he could work underwater, this slowing down the work rhythm, and the depths at which it would be possible to work would remain limited.

Another object of the present invention is to produce a self-propelled machine that may work continuously at depths of several hundreds of meters for the whole duration of a given operation, by placing the operators in good conditions of temperature and ease of movement, without their then having to respect decompression times or to remain in saturation in pressurized enclosures.

These objectives are achieved by means of an underwater machine that may carry out mechanical digging and/or handling work on the sea-bed, which comprises, in combination, on the one hand a self-propelled chassis moving on the sea-bed on endless tracks, said chassis having material handling means, e.g., mechanical digging and/or handling means, means for hydraulically driving said latter as well as the movement of the endless tracks, an electrically powered hydraulic pumping system driven by a submersible electric motor supplied through an electric cable coming from the surface and a horizontal platform, and on the other hand, submarine for containing at least one operator and comprising propellers, means for temporary fixation of the submarine on said platform and means for transmitting orders to the elements controlling said hydraulic drive means.

The invention consists in a combination of means which are known per se. As self-propelled chassis moving on endless tracks over the sea-bed, a mechanical shovel or bulldozer chassis may, for example, be used, after having been adapted to drive the hydraulic system by a submersible electric motor which will be supplied through a cable from a ship on the surface.

As a submarine, an observation and inspection submarine may be used, of a type already known, comprising for example a sphere provided with portholes, in which two occupants can be installed. Submarines of this type are known which have a self-contained oxygen-supply lasting about 100 hours, a self-contained system of displacement of about 4 hours and which may descend to several hundreds of meters, which suits this application perfectly.

The invention resides in the combination of these two known means and in the adaptations that this combination has brought about to easily obtain a good mutual positioning and good fixation of the submarine on the chassis, as well as to transmit the orders from the submarine to the chassis.

The invention relates more particularly, but not limitatively, to a machine for mechanically burying, in a trench dug out in the sea-bed, an underwater cable previously unwound on said sea-bed.

For this particular application, a plowshare is fixed to the rear of the self-propelled chassis on an articulated support moved by at least one hydraulic jack. This articulated support also bears a stirrup piece, placed above said plowshare, in which said cable passes and, at the rear of the said stirrup piece, a pusher means moved by at least one hydraulic jack which bends the cable downwardly into the trench hollowed out by the plowshare.

The underwater cables comprise joints whose diameter is greater that that of the cable.

The presently known burying machines do not enable these joints to be buried at the same time as the cable, this necessitating a separate burying operation of said joints, leading to folds in the cable or an unsatisfactory burying thereof.

According to one characteristic of the invention, the plowshare of a burying machine comprises over the whole of its height nozzles connected to pressurized water pipes which enable water jets to be produced which will locally enlarge the trench at those spots where the joints of the cable will lie.

The stirrup piece through which the cable passes is of sufficient section to allow the joints to pass so that said latter are buried in the normal course of the cable burying operation.

The cable pusher means is fast with two vertical plates which are spaced apart by a distance substantially equal to the width of the plowshare, said plates serving to avoid caving in of the side walls of the trench immediately behind the plowshare.

The result of the invention is a novel mechanical digging and/or handling machine permitting work to be carried out on the sea-bed, at depths of several hundreds of meters.

One of the advantages of this machine is that it is piloted by an operator, this enabling the machine to be driven and the movements of the working or lifting tools to be controlled with high precision in the displacements and maneuvers. In this way, diverse operations can be carried out mechanically on the sea-bed, for example, levelling, hollowing, digging, or lifting, hauling, transporting, load-displacing, i.e. the same operations which are carried out on the surface with machines such as bull-dozers, graders, mechanical shovels, scrapers, cranes, tractors, etc.

The operators installed in the submarine are under conditions of temperature and ease of movement which are not too restraining and which may be tolerated for the whole duration of a given operation. The return to the surface is effected rapidly, without having to respect the steps of decompression or to remain in saturation in a pressurized enclosure.

A machine according to the invention may work easily up to depths of several hundreds of meters since, apart from the submarine body, it does not comprise any sealed compartment having to resist the hydrostatic pressure.

A machine according to the invention for burying an under-water cable may easily follow a cable already unwound on the sea-bed. The unwinding of the cable may therefore be effected rapidly without being delayed by the burying of said cable which is carried out separately and mechanically by the machine according to the invention which enables considerable lengths per given operation to be buried, hence reduced costs.

The invention will be more readily understood on reading the following description with reference to the accompanying drawings, in which.

Figure 1:
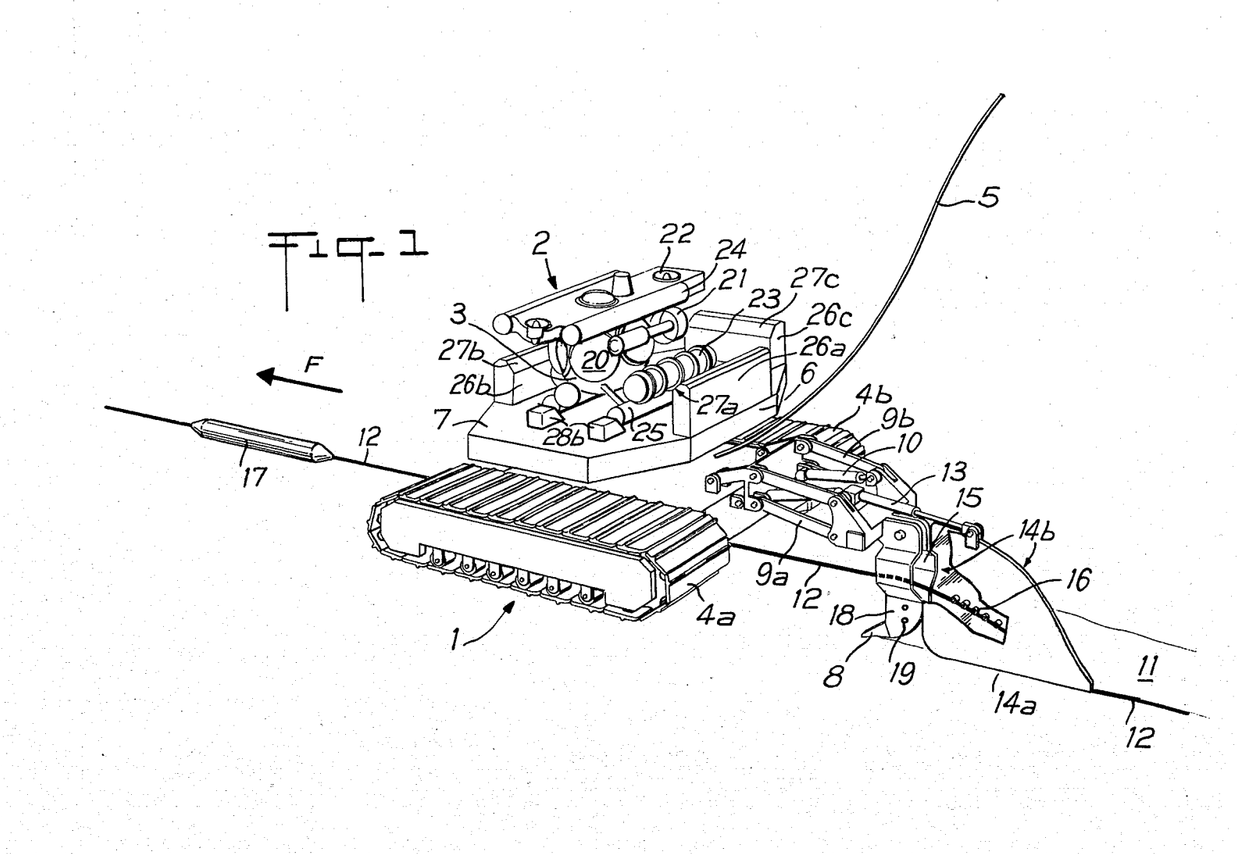
FIG. 1 is a perspective view of the whole of the machine according to the invention.

Referring now to the drawings, FIG. 1 shows a machine according to the invention for burying cables in a trench hollowed out of the sea-bed.

It is to be specified that this application has been chosen by way of illustration and that this choice is in no way limitative. The same machine may serve other digging or lifting functions by being equipped with devices or tools adapted to these operations.

The machine is composed of two main parts, namely a self-propelled chassis 1 and a submarine 2 in whose body 3 one or more operators may be installed. The submarine 2 may separate from the chassis to bring the operators to the surface and return to attach itself to the chassis again with new operators.

The chassis 1 is identical to the chassis of self-propelling digging or handling machines used on the surface, for example of a mechanical shovel which moves on two endless tracks 4a and 4b driven by hydraulic motors supplied by an electrically powered hydraulic pumping system. The electric motor driving the hydraulic system is a submersible motor and it is supplied through an electric cable 5 coming from the surface.

On the rotating turret 6 with which such a chassis is normally equipped, is disposed a horizontal platform 7 on which the submarine 2 rests and is fixed.

In the example chosen, the chassis is equipped with a plowshare 8 carried by two articulated parallelograms 9a, 9b which are fixed to the rear of the chassis and enable the plowshare to be raised or lowered by means of a hydraulic jack 10.

When the chassis advances in the direction of arrow F, the plowshare 8 digs a trench 11. The cable 12 was previously unwound on the sea-bed, and the chassis, driven by the operators inside the submarine, advances, astride the cable 12. Said cable passes through a stirrup piece 15 located above the plowshare, and is bent downwardly behind the plowshare by an articulated pusher means moved by a jack 13. This pusher means is fast with two side plates 14a and 14b which are separated by a distance substantially equal to the width of the plowshare and thus to the width of the trench.

The function of these plates 14 is to avoid caving in of the side walls of the trench immediately behind the plowshare 8 in that portion of the trench where the cable is bent downwardly. On the contrary, when the plates 14 have passed a certain point, the walls may cave in and cover the cable.

FIG. 1 shows a partial tearing away of the plate 14a to expose rollers 16 disposed between the two plates 14a and 14b. The cable 12 passes beneath these rollers which form a rearwardly inclined ramp which bends the cable downwardly into the trench. This ramp begins immediately to the rear of and slightly above the stirrup piece 15 through which the cable passes and extends rearwardly while being downwardly inclined, the rear end being located slightly above the lower edge of the plates 14.

The cable 12 comprises joints 17 whose diameter is greater than that of the cable. For example, a joint 17 has a diameter of 350 mm and a length of 3 m. The burying of these joints is a problem which hitherto has not been satisfactorily solved. A machine according to the invention presents the advantage of allowing the joints to be continuously buried at the same time as the cable.

To this end, the support 18 of the plowshare which connects said plowshare to the articulated parallelograms 9a and 9b, comprises over the whole of its height laterally directed nozzles 19 which are supplied with pressurized water supplied by a pump carried by the chassis 1. The stirrup piece 15 is sufficiently wide to allow the joints 17 to pass. When the operator installed in the submarine 2 sees that the plowshare is about to arrive at a cable joint, he supplies the nozzles 19 with pressurized water so that the jets of water hollow out the side walls of the trench which consequently becomes sufficiently wide, where the joints 17 lie, to allow the said joint to penetrate and be buried.

The submarine 2 is a submarine of any known type, for example an observation submarine comprising a spherical body 3, that may contain two men, provided with port-holes 20 allowing direct vision. This submarine comprises side propellers 21 and vertical propellers 22 driven by submersible electric motors in dielectric oil at equal pressure with the outside medium.

The submarine 2 comprises tanks 23 of rechargeable batteries, oxygen cylinders contained in the feet 25, which ensure an independent propulsion for 4 hours and independent air supply of 96 hours. It also comprises two cylindrical side ballasts 24.

Such submarines are well known and it is unnecessary to describe them in greater detail here.

Such submarines are currently constructed which may reach depths of immersion of several hundreds of meters.

The chassis 1 and the submarine 2, of any known type, comprise adaptations for the purpose of the invention, which consist in the platform 7 intended to receive the submarine, which comprises means for pre-centering and centering the submarine, means for ensuring a temporary fixing of the submarine on said platform; means for transmitting the orders between the submarine and the chassis and for supplying the submarine with energy during a given operation.

FIG. 1 shows on either side of the platform 7 and to the rear thereof, caissons 26a, 26b and 26c containing different equipment, particularly the electrically powered hydraulic pumping system and the different circuits intended for driving and controlling the movements of the endless tracks and the jacks controlling the equipment, for example jacks 10 and 13. The upper face of these caissons comprises a precentering ramp, 27a, 27b and 27c respectively. These ramps are raised with respect to the level of the platform 7 and have a surface inclined towards the center of the platform. When the submarine comes to rest on the platform, if it is not well centered, the feet 25 of the submarine slide on the ramps 27 so that the submarine centers itself.

Figure 2:
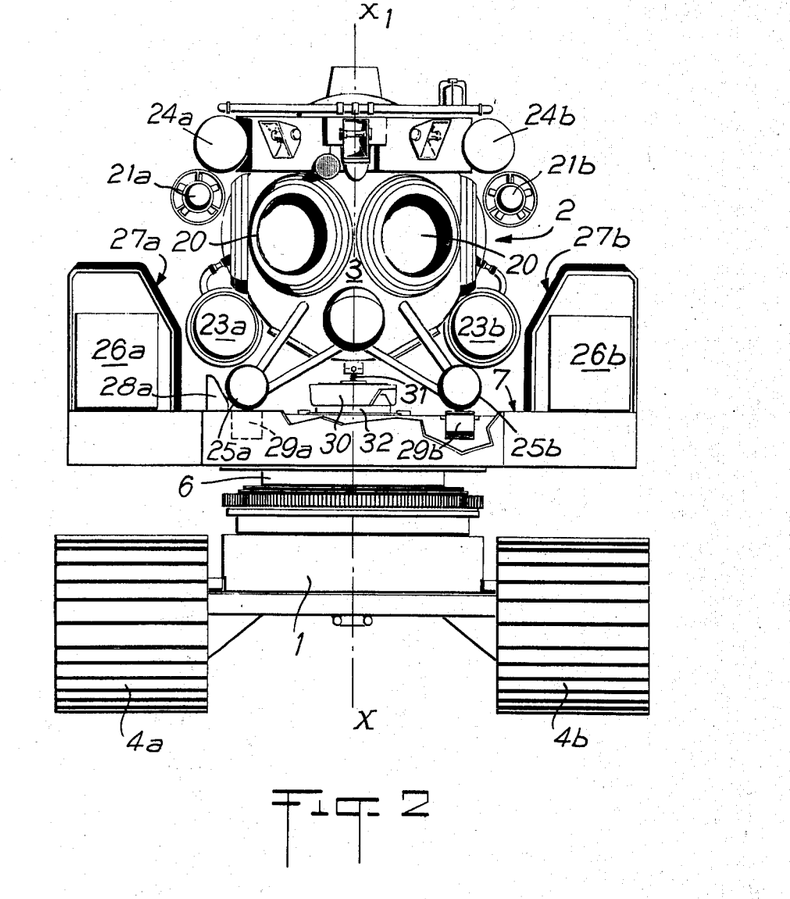
FIG. 2 is a front view thereof on a larger scale.

FIG. 2 shows a machine according to the invention in plan view. The homologous parts are designated by the same reference numerals. This Figure shows the platform 7 mounted on the chassis by means of the turret 6 pivoting about the vertical axis $x$-$x_1$. Also shown are the side caissons 26a and 26b bearing the pre-centering ramps 27a and 27b. The platform 7 comprises lateral centering ramps 28a and 28b and front and rear centering ramps 28c, 28d. The side ramp 28b is not visible in the Figure. These side ramps are parallel and symmetrical with respect to the longitudinal axis of the platform and present a surface inclined towards this axis.

The spacing between the lowest points of the side ramps 28a and 28b and the front and rear ramps 28c and 28d is such that the feet 25a and 25b are housed between these ramps, this ensuring a good centering of the submarine on the platform with a tolerance of about ± 5 mm.

FIG. 2 shows electro-magnets 29a and 28b placed under the platform 7 below the position of the feet 25a and 25b. The excitation of these electro-magnets is controlled from the submarine and the magnetic attraction which they exert on the metal feet 25a and 25b maintains the submarine temporarily fixed on the chassis 1.

This fixation method enables the submarine and chassis to be joined together and separated almost instantaneously without any time lost.

The method presents advantageous of rapidity with respect to a solution in which the submarine would be placed on the platform and stabilized by filling ballasts. This solution offers better safety in the case of it being necessary to bring an operator up urgently to the surface, since the submarine may separate immediately from the chassis and rise rapidly due to the vertical propellers. This sollution gives the operators a feeling of greater security, which is psychologically important.

FIG. 2 shows a casing 30 fixed elastically by means of springs 31 underneath the submarine. This casing 30 contains the devices transmitting the orders from the submarine to the chassis. It is fitted around a casing 32 fixed to the platform 7 which contains the devices for receiving the orders coming from the submarine.

Figure 3:
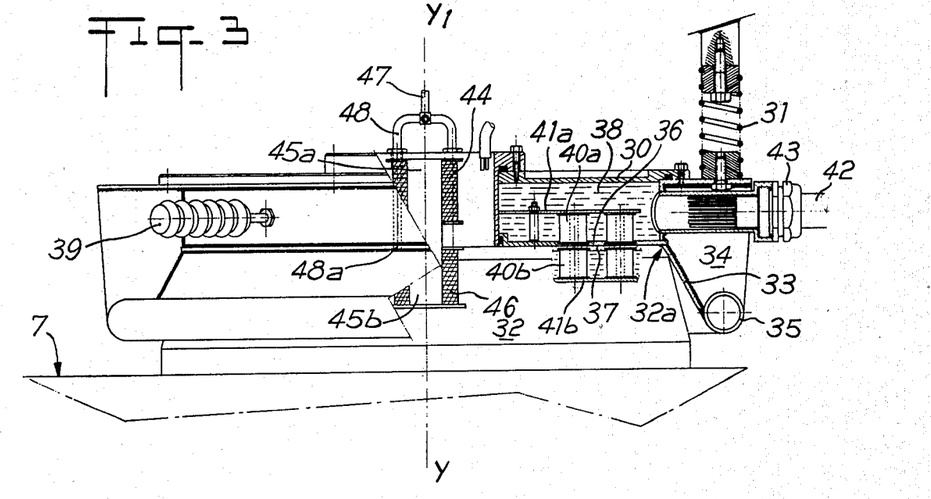
FIG. 3 is a view in elevation and part section of the casings containing the order-transmitting and receiving devices.

FIG. 3 is a view in half-section, on a larger scale, of the casings 30, 32 and the devices that they contain.

The casing 30 is suspended from the bottom of the submarine by springs such as spring 31 so that the axis $y$-$y_1$ may be offset slightly in any direction with respect to the vertical axis $x$-$x_1$ of the submarine body. This elastic suspension has for its object to allow the casing 30 to be centered on casing 32, independently of the centering of the submarine on the platform of the chassis and therefore with a much greater accuracy, of the order of a millimeter, which is necessary to ensure a good transmission of the orders between the submarine and the chassis.

The casing 30 comprises, in its lower part, a truncated centering skirt 33 reinforced by bracing gussets 34 and a tubular belt 35.

The casing 32, fixed to the center of the platform 7, is generally truncated in form, converging upwardly, the upper edge 32a of which is rounded. FIG. 3 shows the skirt 33 fitted on the casing 32. In this position, the bottom 36 of the casing 30 is applied to the cover 37 of the casing 32.

The casings 30 and 32 are water-tight and filled with a dielectric liquid, for example a mineral oil 38. They comprise means for maintaining this oil at the same pressure as the outside medium, these means being constituted, for example, by a deformable balloon 39 placed outside each casing. The balloon of the casing 32 is not visible. The casings 30 and 32 therefore do not have to resist the hydrostatic pressure and their walls may be relatively thin.

The casing 30 and casing 32 contain pairs of induction coils such as pair 40a, 40b placed opposite each other, one, 40a, above the bottom 36 of the casing 30 and the other, 40b, beneath the cover 37 of the casing 32.

FIG. 3 shows that the bottom 36 and the cover 37 have a thin portion in the space between the two coils, this being made possible by the fact that they are at equal pressure with the outside and do not have to resist the hydrostatic pressure. This thin portion reduces the air-gap between coils to a thickness of the order of 2 mm and enables a good coupling between coils to be obtained.

These coil 40a are mounted on a plate 41a carrying the printed circuits for connection of the coils. Similarly, the coils 40b are mounted on a plate 41b carrying the printed circuits for connection of the coils 40b. The operators inside the body 3 have at their disposal means for sending orders into the transmitter coils 40a, for example by acting on a potentiometer. The orders are transmitted by induction to the coils 40b.

The electrical connections between the submarine and the casing 30 are made by a flexible multi-lead cable 42 which penetrates into the casing 30 through a packing box 43.

The casing 30 contains a power coil 44 wound around a core 45a which constitutes the secondary winding of a transformer whose primary winding is constituted by a coil 46 placed in the casing 32 about core 45b located in extension of the core 45a. The coil 46 is fed from cable 5 which connects the chassis 2 to the surface. The secondary winding 44 serves to feed the rechargeable batteries of the submarine while said latter is resting on the chassis so that the submarine is constantly ready to shuttle between the sea-bed and the surface and does not have to be immobilized on the surface to recharge the batteries.

FIG. 3 also shows a pipe 47 for compressed air connected to the submarine by a flexible tube which communicates with nozzles 48 passing through the casing 30, the lower end 48a of which opens out into the thickness of the bottom of said casing.

These nozzles 48 enable the operators to send a jet of compressed air at the moment when the casing 30 fits onto the cone 32 to sweep the upper surface of said cone 32 and remove the foreign bodies which might be deposited thereon and which would cause the skirt 33 to fit badly on the cone 32, hence a poor transmission of the orders. This sweeping by jets of compressed air or pressurized water is very important to ensure a good connection between the submarine and the self-propelled chassis.

Figure 4:
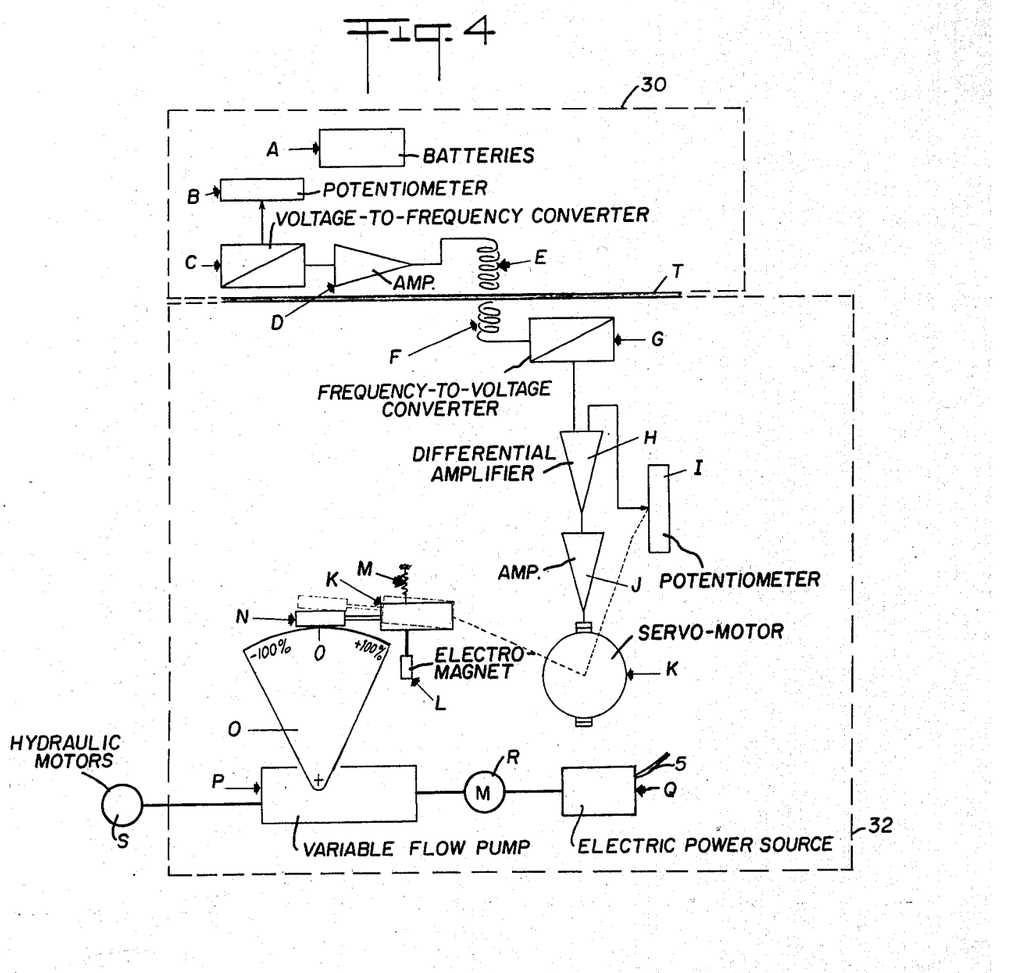
FIGS. 4 and 5 are diagrams of the order-transmitting and receiving circuits.

FIG. 4 shows the electric circuits by which the orders coming from the submarine are transmitted to the variable flow pumps supplying the hydraulic motors driving the endless tracks 4a and 4b.

The double horizontal line T represents the support surface of the casing 30 on casing 32, the part above the line being located in the casing 30.

Reference A represents the batteries of the submarine which supply energy to the circuits placed inside the casing 30.

Reference B represents a potentiometer on which an operator acts to vary a voltage. This potentiometer is connected to a voltage-frequency converter C which converts the variation in voltage into a variation in frequency. The output of the converter C is connected to an amplifier D which is itself connected to an emitter induction coil E.

Opposite the coil E is located, in casing 32, a receiver coil F which emits a voltage of the same frequency as that which supplies coil E.

The coil F is connected to a frequency-voltage converter G. The converter G is connected to a differential amplifier H which compares this voltage with a reference voltage supplied by a potentiometer I whose position is controlled by the position of the servo-motor K. The output of the amplifier H is connected to an amplifier J which supplies the servo-motor K.

Reference Q represents the electric source of the chassis which is fed through cable 5. The left-hand side of the Figure shows at P the variable flow pump, driven by submersible electric motor R, which supplies the hydraulic motors S for driving an endless track of the mobile chassis. The variation of flow is controlled by the rotation of a toothed sector O. This toothed sector meshes with an endless screw N driven by the servo-motor K.

Reference L represents an electromagnet which maintains the screw N in contct with the sector O, against a return spring M. In the case of a breakdown of control current, the servo-motor K and the screw N occupy the position shown in broken lines and the toothed sector O takes its median position which causes the self-propelled chassis to stop.

The median position of the sector O, marked "O", corresponds to the zero flow of the pump. From this median position, the sector O may pivot in one direction or in the other, up to the end positions marked −100 percent and +100 percent which correspond to the maximum speeds of the endless tracks in one direction or in the other.

Figure 5:
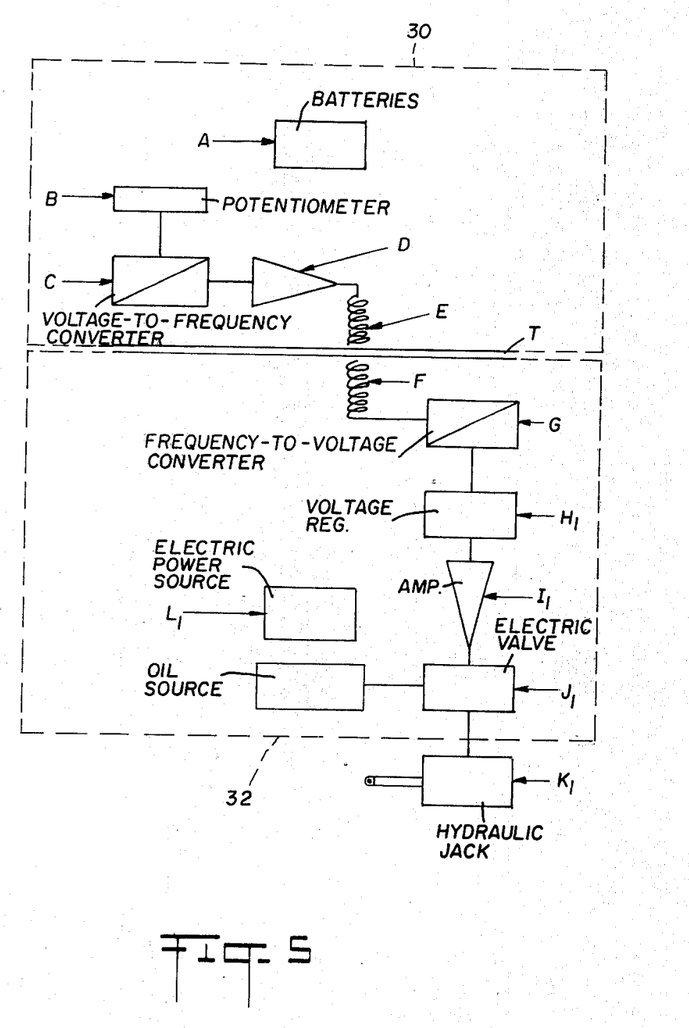

FIG. 5 shows a diagram of the electrical circuits for controlling a hydraulic double-acting jack K1, for example jack 10, 15 or any other jack controlling the movement of a tool or apparatus mounted on the chassis.

References A or G show circuits homologous to those of FIG. 4 and fulfilling the same function.

Reference H1 represents a voltage regulator, reference I1 an amplifier and J1 an electric servo-valve which controls the supply of oil to jack K1. L1 represents the electric supply of the circuits contained in the casing 32.

The presence of voltage-frequency converters in the casings 30 and frequency-voltage converters in the casings 32 makes it possible easily to transmit the orders by variation of voltage by means of a potentiometer and to obtain a good transmission of the orders by means of the induction coils, the receiver coil very faithfully reproducing the frequency variations in the emitter coil.

What we claim is:

1. A submarine machine for carrying out mechanical operations on the sea-bed, comprising, on the one hand, a self-propelled chassis movable on the sea-bed by means of endless tracks and carrying mechanical material handling means, hydraulic means for driving said material handling means and causing movement of said endless tracks and a horizontal platform, and on the other hand, a submarine for containing at least one operator and comprising propeller means for moving said submarine through the water and means for transmitting orders to said hydraulic means, said platform of said self-propelled chassis comprising electromagnets and said submarine having means adjacent said electromagnets when said submarine is in place on the platform which upon excitation of said electromagnets exerts a force of attraction on the submarine and holds the latter temporarily fixed on the platform.

2. A machine as claimed in claim 1, in which said chassis comprises, on each side of the platform and to the rear thereof, ramps engageable with portions of said submarine for pre-centering the submarine, each of said ramps having a raised surface inclined towards the center of the platform.

3. A machine as claimed in claim 2, in which said submarine comprises two cylindrical side feet and in which said chassis comprises on each side of the platform and to the front and rear thereof, further ramps for centering the submarine, said further ramps having surfaces inclined towards one another and engageable with said feet.

4. A machine as claimed in claim 1, wherein said submarine has a first watertight casing secured to the bottom thereof by elastic means, said casing having a centering skirt at the lower part thereof, and wherein said platform has a second watertight casing thereon in the shape of a truncated cone receivable within said skirt for centering said first casing with respect to said second casing and wherein said means for transmitting orders comprises cooperating electrical means within said first casing and said second casing for transmitting electrical signals therebetween.

5. A machine as claimed in claim 4, wherein said first casing has a bottom cover and said second casing has a top cover for contacting said bottom cover and wherein said electrical means comprises pairs of induction coils, one coil of each pair being adjacent said bottom cover and the other coil of each pair being adjacent said top cover.

6. A machine as claimed in claim 5, wherein said first casing and said second casing contain dielectric liquid and further comprising means for maintaining said liquid at a pressure substantially equal to the pressure of the water in which the machine may be immersed.

7. A machine as claimed in claim 4, wherein said hydraulic means comprises motive means operable by fluid under pressure, an electrically powered hydraulic pumping system connected to said motive means and having control means for controlling the supply of said fluid to said motive means and wherein said electrical means comprises a first induction coil in said first casing and a second induction coil in said second casing and in the field of said first coil, a frequency variable converter having a frequency control on said submarine, said frequency control being accessible to and operable by an operator, means connecting said converter to said first coil, a frequency responsive circuit connected to said second coil, and means connected to said circuit and responsive to the output thereof and connected to said control means for controlling the supply of said fluid to said motive means for operating said motive means in accordance with the operation of said frequency control.

8. A machine as claimed in claim 7, wherein said converter is a voltage-to-frequency converter and said frequency control is a potentiometer, and wherein said circuit comprises a frequency-to-voltage converter.

9. A machine as claimed in claim 8, wherein said motive means comprises a hydraulic motor having a driving connection with said endless tracks.

10. A machine as claimed in claim 8, wherein said motive means is a hydraulic jack and said material handling means is operable by said jack.

11. A machine as claimed in claim 4, further comprising nozzles on said first casing directed toward said second casing and means for connecting said nozzles to a source of pressurized fluid for sweeping foreign matter from the upper surface of said second casing when said submarine is being placed on said chassis.

12. A machine as claimed in claim 4, further comprising a primary transformer winding in said second casing, means for connecting said primary winding to an electrical, alternating current source external to said chassis, a secondary transformer winding in said first casing and coupled to said primary winding and load means within said submarine connected to said secondary winding.

13. A machine as claimed in claim 1 for mechanically burying, in a trench hollowed out on the sea-bed, an underwater cable which has already been laid on said sea-bed, said machine comprising, fixed to the rear of said chassis, a plowshare carried by an articulated support and a hydraulic jack for removing said support, said support having a stirrup piece disposed above said plowshare for the passage of said cable, and, to the rear of said stirrup piece having articulated pusher means engageable with said cable to bend the cable downwardly into a trench hollowed out by the plowshare, and a further hydraulic jack for operating said pusher means.

14. A machine as claimed in claim 13, wherein said cable has joints which are larger in diameter than other parts of said cable, and wherein said plowshare comprises a plurality of nozzles distributed in the direction of the height of said plowshare and further comprising pressurized water means connected to said nozzles for locally enlarging said trench, by means of jets of water, at the spots where said cable joints will lie.

15. A machine as claimed in claim 13, wherein said cable pusher means is secured to two vertical plates, placed immediately to the rear of said plowshare, said plates being parallel to the longitudinal axis of the machine and separated from each other by a distance substantially equal to the width of said plowshare, whereby said plates retain the side walls of the trench immediately behind the plowshare as said chassis is moved.

16. A machine as claimed in claim 15, further comprising rollers disposed between said plates to form an inclined ramp which begins immediately behind and above said stirrup piece and which extends rearwardly and towards a point located immediately above the lower edge of said plates.

* * * * *

UNITED STATES PATENT AND TRADEMARK OFFICE
CERTIFICATE OF CORRECTION

PATENT NO. : 3,990,377
DATED : November 9, 1976
INVENTOR(S) : JEAN-PIERRE G. MARQUINEZ It is certified that error appears in the above—identified patent and that said Letters Patent are hereby corrected as shown below:

Col. 1, line 67 - after "hand," insert --a--

Col. 5, line 42 - "28b" should read --29b-- line 52 - "advantageous" should read --advantages--

Col. 6, line 43 - "coil" should read --coils--

Col. 7, line 51 - "contct" should read --contact--

Col.10, line 10 - "removing" should read --moving--
(Claim 13)

Signed and Sealed this

Twenty-second Day of March 1977

[SEAL]

Attest:

RUTH C. MASON
*Attesting Officer*

C. MARSHALL DANN
*Commissioner of Patents and Trademarks*